Aug. 17, 1965 W. E. RUDISCH 3,200,658

COUPLE

Filed July 31, 1961

WITNESS:
Esther M. Stockton.

INVENTOR.
Walter E. Rudisch
BY
John Phillips Ryan
ATTORNEY

United States Patent Office  3,200,658
Patented Aug. 17, 1965

3,200,658
COUPLE
Walter E. Rudisch, Elmira, N.Y., assignor to The Bendix Corporation, Elmira, N.Y., a corporation of Delaware
Filed July 31, 1961, Ser. No. 128,188
11 Claims. (Cl. 74—125.5)

The present invention relates to a couple and more particularly relates to an indexing couple. Specifically, the invention relates to a couple for drivingly connecting one of two driven members to a driving member, the coupling incorporating therein means for rotating said one of the driven members relative to the other driven member while continuously maintaining the driving connection.

It is an object of the present invention to provide a couple which is simple structurewise, positive, efficient and reliable in operation and economical to manufacture.

It is an object of the invention to provide a couple having body members, including controllable electromagnets and torque transmitting means, fixed in relation to a first driven member and having means including driver means fixedly secured to a second driven member, the driver means being adapted, responsive to the energization of the electromagnets, to selectively engage the body members' torque transmitting means in such a manner that the driver means and the second driven member are rotated relative to the first driven member while maintaining a continuous unbroken driving connection.

It is another object of the invention to provide a couple comprising spatially separated magnet bodies mounted on a power shaft to which is secured a first driven member, the magnet bodies having opposed circumferentially misaligned sets of axially extending teeth, and a second driven member mounted for rotation relative to the first driven member connected to driver means having torque transmitting teeth thereon, the driver means being slidably journalled intermediate the magnet bodies and having the driver torque transmitting means adapted for single and concomitant engagement with the teeth of one or both of the magnet bodies in a fashion calculated to cause the driver means and the second driven member to be rotatively displaced relative to the first driven member while maintaining a continuous unbroken driving connection.

With the above and other objects in view which will appear as the description proceeds, this invention resides in the novel construction, combination and arrangement of parts substantially as hereinafter described and more particularly defined in the appended claims, it being understood that such changes in the precise embodiment of the hereindisclosed invention may be made as come within the scope of the claims.

The accompanying drawing illustrates a single embodiment of the invention constructed according to the best modes so far devised for the practical application of the principles thereof, and in which.

Figure 1:
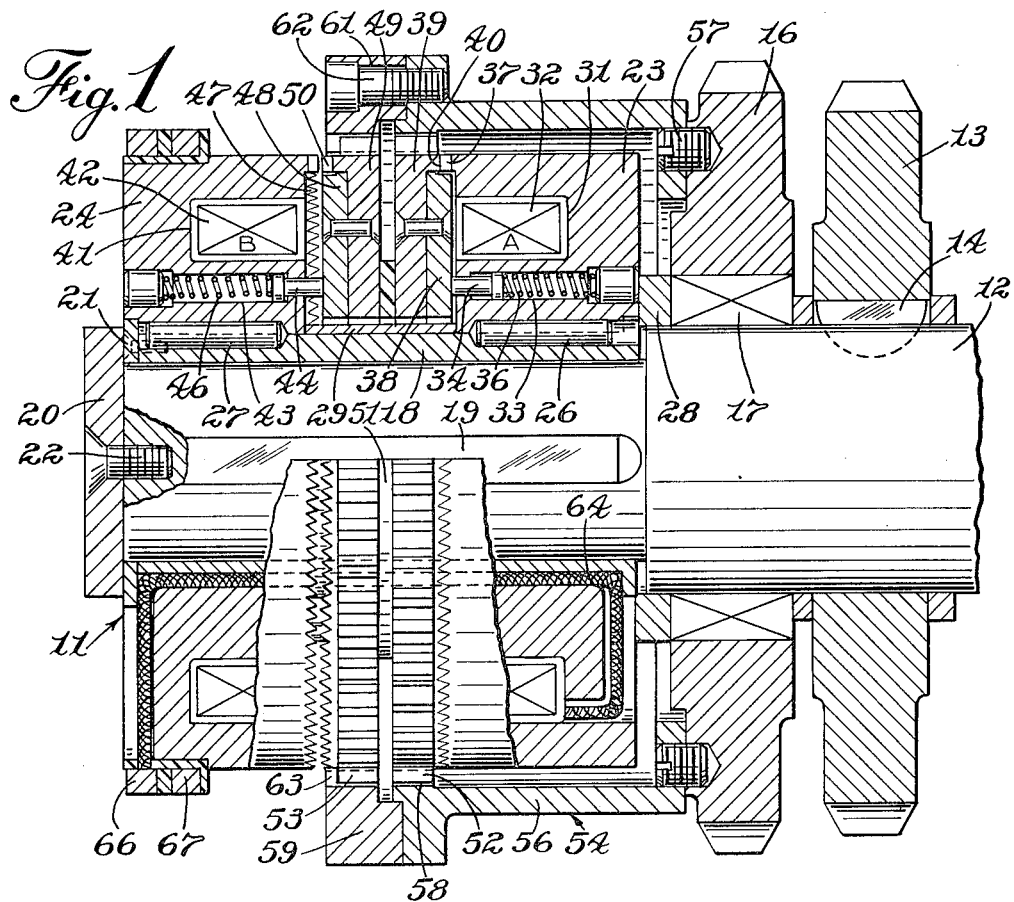
FIGURE 1 is a plan view of an electromagnetic indexing couple embodying the invention, portions thereof broken away and in section for the sake of clarity, the driver means illustrated as being singly drivingly engaged with the right-hand magnet body.

Referring now more particularly to the accompanying drawing in which like reference characters indicate like parts, the numeral 11 generally designates a couple embodying the invention, the couple being secured to a power shaft 12. A first driven member 13, illustrated as a gear member for the purpose of this description but not limited thereto, is secured to the shaft by any convenient means such as a key 14. A second driven member 16, also illustrated as a gear but not limited thereto, is journalled on the shaft by means of a bearing 17.

The shaft extremity is reduced in diameter and accommodates a bushing 18 keyed thereto against rotational displacement by a key (not shown) and a keyway 19. The bushing is secured against axial displacement by retainers 20 and 21. Retainer 20 is connected to the shaft extremity by any convenient means such as a screw 22 while the retainer 21 is secured by screws to the bushing extremity. A pair of body members comprising a right-hand magnet body 23 and a left-hand magnet body 24 are adapted to engage the bushing and are positioned thereon so as to define an axial separation having a predetermined length. The magnet bodies 23 and 24 are annular members non-rotatably secured to the bushing 18 by means of a plurality of pins 26 and 27, respectively. Magnet body 23 is separated from the bearing 17 by a spacer 28 and from the magnet body 24 by a spacer sleeve 29. The magnet bodies and the spacers are retained against axial displacement by the retainers 20 and 21 with the retainer 21 directly engaging portions of the magnet body 24. The spacer sleeve 29 defines the length of the axial separation between the body members and its exterior surface is cylindrical to provide a bearing surface.

The magnet body 23 is formed with an annular cavity 31 opening into the axial separation. A coil 32 for creating an electromagnetic field is secured in the cavity 31 by means of epoxy resin or some comparable seating compound. For the purpose of this description, the coil 32 will hereinafter be referred to as magnet A. A plurality of transverse axial passages 33 in the magnet body each house a substantially T-shaped plunger 34 biased by a spring member 36 confined between the cross-arm portion of the plunger and a plug in the passage. The stem portion of the plunger extends into the axial separation to slidably contact portions of driver means hereinafter described. Torque transmitting means are formed adjacent the outermost marginal portion of the magnet body and consist of a set or plurality of axially extending teeth 37, the teeth preferably being of the "saw-tooth" variety. The teeth extend into the axial separation.

The magnet body 24 is similar to the magnet body 23 and is formed with an annular cavity 41 opening into the axial separation. A coil 42 for creating an electromagnetic field is secured in the cavity 41 in the manner above described. For the purpose of this description, the coil 42 will hereinafter be referred to as magnet B. A plurality of transverse axial passages 43 in the magnet body each house a substantially T-shaped plunger 44 biased by a spring member 46 which is confined between the cross-arm portion of the plunger and a plug in the passage. The stem portion of the plunger extends into the axial separation to have sliding contact with a portion of the driver means hereinafter described. Torque transmitting means are formed adjacent the outermost marginal portion of the magnet body and consist of a set or plurality of axially extending teeth 47 also preferably of the "saw-tooth" variety. The teeth 47 also extend into the axial separation. The teeth 37 and 47 on the body members 23 and 24, respectively, are on the opposing faces of these body members and are formed so as to be circumferentially offset relative to each other, that is, the teeth of each of the torque transmitting means are positioned on each magnet body to be circumferentially mismatched and therefore are out of axial alignment a predetermined amount.

Driver means are slidably journalled on the bearing surface of the spacer sleeve 29 in the axial separation between the body members and consist of separate armature plates 38 and 48 positioned to be attracted or motivated by the magnetic attraction of the energized magnets A and B, respectively. Driver members 39 and 49 are fixedly secured to the armatures 38 and 48, respectively. Positive torque transmitting means are formed adjacent the outer marginal portions of each of the driver members and consist of sets or pluralities of axially extending teeth 40 and 50 complementing and adapted for engagement with the teeth 37 and 47, respectively. The driver members 39 and 49 and their associated armatures 38 and 48 are independent of each other and may be axially separated by a non-magnetic spacer 51. The plungers 34 and 44 normally slidably engage the respective armatures to bias the driver members away from engagement with the body members. The plungers 34 and 44 may be functionally replaced by spring means connected to the opposing back faces of the driver members. The spring means would tend to draw the driver members together and away from their respective body members thus serving the same function as the plungers. The driver members 39 and 49 have axially extending splines 52 and 53, respectively, formed on their outer peripheral portion.

An adapter member generally designated as 54 comprises a splined adapter 56 fixedly secured to the driven gear 16 by any convenient means such as a set screw 57. The splined adapter extends axially from the gear and has a splined extremity 58 positioned to engage the splines 52 of the driver member 39. An adjustable splined ring member 59 having a plurality of circumferentially spaced elongated or oval shaped mounting holes 61 is secured to the splined adapter 56 by bolts 62. The ring member on its radial inner face has splines 63 which engage the splines 53 of the driver member 49. The sets of splines 52, 58 and 53, 63 as well as the driver member teeth 40 and 50 are not in axial or circumferential alignment relative to each other. The sets of splines or the teeth 40 and 50 must, however, be circumferentially positioned relative to each other so as to allow the sets of teeth 37, 40 and 47, 50 to partially mesh during concomitant energization of both magnets A and B and to allow the indiivdual sets of teeth to fully mesh whenever magnets A or B are separately energized. It will be apparent that, because of the spline connections between the driver members and the adapter member, the driver members and the respective armature plates will each be slidably independent but they will not be rotatably independent. The attainment of the proper circumferential relationship between the sets of splines 52, 58 and 53, 63 is made possible by the adjustable splined ring member 59 which may be rotated relative to the splined adapter 56 by reason of the elongated mounting holes 61. Preferably the set of splines 53, 63 is circumferentially offset relative to the splines 52, 58 an amount less than the circumferential misalignment of teeth 37 and 47.

The magnets A and B are separately controllable by means not wholly shown nor forming a part of this invention. Magnet A is electrically connected to the control means by a lead 64 supported in appropriately formed recesses in the magnet bodies 23, 24 and the bushing 18. The lead 64 connects the coil 32 to a commutator ring 66. The coil 32 has one lead (not shown) directly connected to ground via the magnet body 23. The magnet B is connected to the commutator ring 67 by a lead (not shown) and likewise has a lead (not shown) connected to ground via the magnet body 24.

In operation—the power shaft 12 is rotated by a source of power (not shown) and directly drives the first driven gear 13. Magnet A is energized and magnet B is deenergized by control means (not shown) to establish an electromagnetic field which attracts the armature plate 38 toward the magnet body 23. The magnetic circuit thus established is contained within the body 23 and the armature 38 with the spacer 51 between the drivers 39 and 49 confining the circuit to the described members. The driver member 39, by reason of its connection with the armature plate 38, is also drawn towards the magnet body and is axially guided by its splined connection with the splined adapter 56. The torque transmitting means 37 and 40 mesh to establish a single positive driving connection best illustrated in FIGURE 1. Since magnet B is not energized, no driving connection will be established between the torque transmitting means 47 and 50 and the spring biased plunger 44 will cooperate with the armature 48 to urge it axially away from the magnet body 24. With magnet A energized and magnet B deenergized, power is transmitted from the shaft directly to the driven gear 13 and indirectly to the driven gear 16 through the magnet body 23, teeth 37, 40, driver member 39, the spline connections 52, 58 and the adapter member 54.

Figures 2, 3:
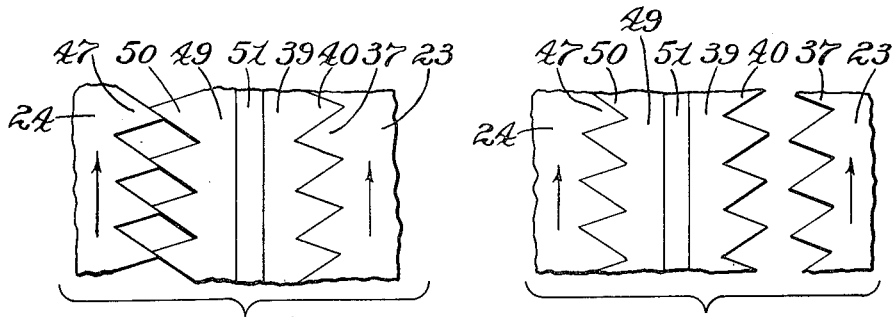
FIGURE 2 is an enlarged fragmentary view illustrating the driver and body members' torque transmitting teeth in concomitant driving engagement.
FIGURE 3 is a view similar to FIGURE 2 but illustrating the driver means singly drivingly engaging the left-hand magnet body.

When it becomes necessary to rotate the driven gear 16 relative to the gear 13, the magnet B is energized concomitantly with the magnet A. Energization of the magnet B causes the armature plate 48 and the associated driver member 49 to be attracted toward the magnet body 24 to establish a second magnetic circuit following a path through the magnet body 24 and the armature plate 48. The magnetic circuits will each be separate and independent by reason of the non-magnetic spacer 51. The armature 38 and driver 39 having been previously attracted into complete engagement with magnet body 23 by the energization of magnet A will remain in that position when magnet B is concomitantly energized. Magnet B will, however, axially attract armature 48 and driver 49 toward magnet body 24 and this will cause the teeth 47, 50 to partially mesh as is best illustrated in FIGURE 2. Since the teeth 37, 40 remain fully meshed, no rotational movement of the driver means 39 and 49 can take place and the degree of partial mesh of teeth 47, 50 is limited to or determined by the degree of circumferential offset existing between the sets of splines 52, 58 and 53, 63. With the magnets A and B both energized, power is transmitted from the shaft directly to the gear 13 and indirectly to the gear 16 through the body members 23 and 24, the fully and partially meshed sets of teeth 37, 40 and 47, 50, respectively, the driver members 39 and 49, the spline connections 52, 58 and 53, 63 and the adapter member 54. In the process, the gear 16 is not rotatably displaced relative to the gear 13.

Subsequently, in the normal control sequence, the magnet A is deenergized and the energization of magnet B is maintained. The spring biased plunger 34 then urges the armature plate 38 and the associated driver member 39 away from the magnet body 23 to completely demesh the teeth 37 and 40. The magnet B continues to attract the armature 48 and its companion driver member 49 toward the magnet body 24 to cause the teeth 47 and 50 to fully mesh as is best illustrated in FIGURE 3. The demeshing of teeth 37, 40 thus allows the full meshing of teeth 47, 50 to take place. The axial movement of the driver teeth 50 toward full mesh is accompanied by rotational displacement of the driver 49 which, in turn, is transmitted to the driven gear 16 through the spline connections 53 and 63 and the adapter member 54. With the magnet A deenergized and the magnet B energized, power is transmitted directly to the gear 13 and indirectly to the gear 16 through the magnet body 24, the fully meshed teeth 47, 50, the driver member 49, the spline connection 53, 63 and the adapter member 54. Cycling the couple from full mesh of teeth 37, 40 and complete demesh of teeth 47, 50 to full mesh of the teeth 47, 50 and complete demesh of teeth 37, 40 is, of course, accompanied by rotational displacement of the driver means 39 and 49, the misaligning or offsetting of teeth 37 relative to teeth 40, and rotation of gear 16 relative to gear 13. If the teeth 37 and 47 on the body members are circumferentially and axially misaligned one degree relative to each other, then upon completion of the described control sequence of magnet energizations, the gear 16 will be rotated one degree relative to the gear 13. If a greater amount of rotational displacement of the gears relative to each other is desired, then the sequences of energizations of the magnets should be continued but in alternating sequences, i.e., alternately in the opposite and same order as that hereinbefore described until such time as the desired degree of displacement between the gears is attained.

While the above description has described the couple as being connected to the power shaft, it will be readily apparent to those skilled in the art that the couple can be fixedly secured to the first driven gear and that the same function will be accomplished without requiring major changes in the operation or the structures described.

From the foregoing description taken together with the accompanying drawing, it will be readily apparent that the invention provides a couple which will continuously maintain a driving connection between a driving and a driven member or between two driven members while providing unique structural means for indexing the members relative to each other.

I claim:

1. An indexing couple for use with a pair of driven members and adapted for continuously maintaining a driving connection with one of the driven members while controllably rotating said one driven member relative to the other driven member, said indexing couple comprising:
    a pair of spaced body members having opposing faces, said body members including actuator means;
    a first driven member,
    a power shaft member fixedly connected to said pair of spaced body members and said first driven member to prevent relative movement therebetween,
    a second driven member rotatively mounted on said power shaft member,
    an adapter member fixedly secured to said second driven member;
    driver means slidably journalled between the opposing faces on the body members, said driver means adapted to be motivated by the actuator means;
    torque transmitting means on the opposing faces of the body members;
    torque transmitting means on the driver means adapted to alternatively singly and concomitantly engage the body members' torque transmitting means; and,
    cooperating means on the driving means and the adapter member for providing a driving connection therebetween.

2. An indexing couple of the type set forth in claim 1 in which the torque transmitting means comprises means for effecting a positive driving connection; and, in which the cooperating means on the driver means and adapter means includes interengaging splines.

3. An indexing couple of the type set forth in claim 1 in which the torque transmitting means comprise: two sets of a plurality of axially extending teeth on the body members, a set of teeth being formed on each of the opposing faces of the body members, said sets of teeth being circumferentially misaligned predetermined amounts relative to each other; two other sets of axially extending teeth on the driver means, each of said other sets of teeth extending in opposite axial directions and adapted for engagement with an adjacent one of the sets of teeth on the body members, said other sets of teeth being further adapted for single and concomitant engagement with the sets of teeth on the body members dependent upon the degree of driver motivation by the actuator means.

4. An indexing couple of the type set forth in claim 1 in which: said actuator means includes coil means carried by at least one of said body members for creating a motivating electromagnetic field; said torque transmitting means on the body members and the driver means comprising means for effecting a positive driving connection; and, said cooperating means on the driver means and adapter member including interengaging splines.

5. An indexing couple of the type set forth in claim 4 in which the means for effecting a positive driving connection comprises: a plurality of axially extending teeth formed on each of the opposing faces of the body members, said teeth on one face being circumferentially misaligned predetermined amounts relative to the teeth on the other face; two sets of axially extending teeth on the driver means, said sets of driver teeth extending in opposite axial directions and adapted for engagement with the adjacent teeth on the body members, said sets of driver teeth being further adapted for single and concomitant engagement with the teeth on the body members depending upon the degree of motivation imparted to the driver means by said actuator means.

6. An indexing couple for use with a pair of driven members and adapted for continuously maintaining a driving connection with one of the driven members while controllably rotating said one driven member relative to the other driven member, said indexing couple comprising:
    a pair of spaced body members having opposing faces, said body members including magnet means;
    a first driven member,
    a power shaft member fixedly connected to said pair of spaced body members and said first driven member to prevent relative movement therebetween,
    a second driven member rotatively mounted on said power shaft member;
    means for selectively energizing the magnet means;
    an adapter member fixedly secured to said second driven member;
    driver means slidably journalled between the spaced body members, said driver means adapted to be motivated by the magnetic attraction of the magnet means;
    torque transmitting means on the opposing faces of the body members;
    torque transmitting means on the driver means adapted to alternatively singly and concomitantly engage the body members' torque transmitting means; and,
    cooperating means on the driver means and adapter member for providing a driving connection therebetween.

7. An indexing couple of the type set forth in claim 6 in which the torque transmitting means on the body members and driver means comprises means for effecting a positive driving connection; and, in which the cooperating means on the driver means and adapter member includes interengaging splines.

8. An indexing couple of the type set forth in claim 6 in which the torque transmitting means comprise: two sets of a plurality of axially extending teeth on the body members, a set of teeth being formed on each of the opposing faces of the body members, said sets of teeth being circumferentially misaligned predetermined amounts relative to each other; two other sets of axially extending teeth formed on the driver means, each of said other sets of teeth extending in opposite axial directions and adapted for engagement with one of the sets of teeth on adjacent body members, said driver-means' teeth being further adapted for single and concomitant engagement with the sets of teeth on the body members dependent upon selective energization of the magnet means.

9. An electromagnetic indexing couple for use with a pair of driven members and adapted for continuously maintaining a driving connection with one of the driven members while controllably rotating said one driven member relative to the other fixed driven member, said electromagnetic indexing couple comprising:
    a pair of spaced body members having opposing faces and defining an axial separation, said body members each including a separately controllable coil for creating an electromagnetic field;
    a first driven member;
    a power shaft fixedly connected to said pair of spaced body members and said first driven member to prevent relative movement therebetween, a second driven member rotatively mounted on said power shaft member;

means for controlling the energization of the coils;

an adapter member fixedly secured to said second driven member communicating with the axial separation between the body members;

driver means slidably journalled in the axial separation adapted to be motivated by the electromagnetic field;

positive torque transmitting means on the opposing faces of the body members;

positive torque transmitting means on the driver means adapted to complement and be selectively singly and concomitantly engageable with the body members' torque transmitting means; and, means on the driver means and adapter member for providing a driving connection therebetween.

10. An electromagnetic indexing couple of the type set forth in claim 9 in which the means for effecting a positive driving connection comprise: two sets of axially extending teeth, one of said sets being formed on each of said opposing faces of said body members, said sets of teeth being circumferentially misaligned predetermined amounts relative to each other; two other sets of other axially extending teeth formed on the driver means, each of said other sets of teeth extending in opposite axial directions adapted for engagement with the adjacent body member teeth, said driver means sets of teeth being further adapted for single and concomitant engagement with the sets of teeth on the body members.

11. An electromagnetic indexing couple of the character described, comprising: a power shaft; a first driven member secured to the shaft; a second driven member journalled on the power shaft, said first and second driven members adapted to be rotated relative to each other; a pair of body members each including a coil for creating an electromagnetic field, said body members being secured to the shaft; two sets of axially extending torque transmitting teeth, one of said sets of teeth being formed on each of said body members, said sets of teeth being circumferentially misaligned predetermined amounts relative to each other; means for selectively energizing the coils; driver means including armature plate means responsive to the electromagnetic field, said driver means being slidably journalled on the shaft and adapted for engagement with the body members; other sets of axially extending torque transmitting teeth, said other sets of teeth being formed on the driver means and extending in opposite axial directions, said other sets of teeth adapted to complement the adjacent sets of body member teeth, said other sets of teeth being further adapted for single and concomitant engagement with the sets of teeth on the body members to thereby continuously maintain a driving connection between the power shaft and said second driven member while rotating said second driven member relative to said first driven member by reason of the driver movements between sequential single engagements with the body members' sets of teeth; an adapter member secured to said second driven members; and, means providing a driving connection between the adapter member and the driver means.

References Cited by the Examiner

UNITED STATES PATENTS

| | | | |
|---|---|---|---|
| 584,073 | 6/97 | Dexter | 88—16.2 |
| 2,932,986 | 4/60 | Musser | 74—640 |
| 2,974,861 | 3/61 | Scheerer. | |
| 3,044,350 | 7/62 | Hartnett | 74—125.5 |

BROUGHTON G. DURHAM, *Primary Examiner.*